(12) United States Patent
Badding et al.

(10) Patent No.: US 11,682,792 B2
(45) Date of Patent: Jun. 20, 2023

(54) COMPOSITE CATHODES FOR SOLID-STATE LITHIUM SULFUR BATTERIES AND METHODS OF MANUFACTURING THEREOF

(71) Applicants: Corning Incorporated, Corning, NY (US); Shanghai Institute of Ceramics, Chinese Academy of Sciences, Shanghai (CN)

(72) Inventors: Michael Edward Badding, Campbell, NY (US); Jun Jin, Shanghai (CN); Zhen Song, Painted Post, NY (US); Qing Wang, Shanghai (CN); Zhaoyin Wen, Shanghai (CN); Tongping Xiu, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 223 days.

(21) Appl. No.: 17/115,235

(22) Filed: Dec. 8, 2020

(65) Prior Publication Data

US 2021/0175542 A1     Jun. 10, 2021

(30) Foreign Application Priority Data

Dec. 9, 2019    (CN) .......................... 201911250277.9

(51) Int. Cl.
*H01M 10/0562*     (2010.01)
*H01M 10/052*      (2010.01)
(Continued)

(52) U.S. Cl.
CPC ..... *H01M 10/0562* (2013.01); *H01M 4/0402* (2013.01); *H01M 4/139* (2013.01);
(Continued)

(58) Field of Classification Search
CPC ...... H01M 4/0402; H01M 4/13; H01M 4/139; H01M 4/38; H01M 4/382; H01M 4/625;
(Continued)

(56) References Cited

U.S. PATENT DOCUMENTS

2019/0312277 A1*  10/2019  Yang .................... H01M 4/583

FOREIGN PATENT DOCUMENTS

| CN | 104617253 A |       | 5/2015 |            |
|----|-------------|-------|--------|------------|
| CN | 107910523 A |       | 4/2018 |            |
| EP |   3043412 A1 | *     | 7/2016 | .......... H01M 10/052 |

OTHER PUBLICATIONS

Busche et al., "In Situ Monitoring of Fast Li-Ion Conductor Li7P3S11 Crystallization Inside a Hot-Press Setup", Chem. Mater., vol. 28, 2016, pp. 6152-6165.

(Continued)

*Primary Examiner* — Ula C Ruddock
*Assistant Examiner* — Scott J Chmielecki

(57) ABSTRACT

A lithium-sulfur battery includes: a substrate; a composite cathode disposed on the substrate; a solid-state electrolyte disposed on the composite cathode; and a lithium anode disposed on the solid-state electrolyte, such that the composite cathode comprises: active elemental sulfur, conductive carbon, and sulfide electrolyte, and the sulfide electrolyte is uniformly coated on at least one surface of the conductive carbon. A method of forming a composite cathode for a lithium-sulfur battery includes: synthesizing dispersed carbon fiber from cotton to form carbonized dispersed cotton fiber (CDCF) powder; in-situ coating of the CDCF with an electrolyte component to form a composite powder; and mixing active elemental sulfur powder with the composite powder to form the composite cathode.

17 Claims, 5 Drawing Sheets

(51) Int. Cl.
H01M 4/139 (2010.01)
H01M 4/62 (2006.01)
H01M 4/04 (2006.01)
H01M 4/38 (2006.01)
H01M 4/02 (2006.01)

(52) U.S. Cl.
CPC .............. *H01M 4/38* (2013.01); *H01M 4/382* (2013.01); *H01M 4/625* (2013.01); *H01M 10/052* (2013.01); *H01M 2004/021* (2013.01); *H01M 2300/0065* (2013.01)

(58) Field of Classification Search
CPC ........... H01M 10/052; H01M 10/0562; H01M 2004/021; H01M 2004/028; H01M 2300/0065
See application file for complete search history.

(56) References Cited

OTHER PUBLICATIONS

Fang et al., "More Reliable Lithium-Sulfur Batteries: Status, Solutions and Prospects", Adv. Mater., vol. 29, 2017, 1606823.

Gu et al, "A Hybrid Electrolyte for Long-Life Semi-Solid-State Lithium Sulfur Batteries", J. Mater. Chem. A, vol. 5, 2017, pp. 13971-13975.

Hart et al, "Rational Design of Sulphur Host Materials for Li—S Batteries: Correlating Lithium Polysulphide Adsorptivity and Self-Discharge Capacity Loss", Chem. Commun., vol. 51, 2015, pp. 2308-2311.

Ito et al., "A Synthesis of Crystalline $Li_7P_3S_{11}$ Solid Electrolyte from 1,2-Dimethoxyethane Solvent", J. Power Sources, vol. 271, 2014, pp. 342-345.

Li et al, "Chemical Immobilization Effect on Lithium Polysulfides for Lithium-Sulfur Batteries". Small 2017, 1701986, pp. 1-21.

Lim et al., "Improvement of Rate Capability by Graphite Foam Anode for Li Secondary Batteries", J. Power Sources, vol. 355, 2017, pp. 164-170.

Lochala et al., "Research Progress toward the Practical Applications of Lithium-Sulfur Batteries", ACS Appl. Mater. Interfaces, vol. 9, 2017, pp. 24407-24421.

Mizuno et al., "New, Highly Ion-Conductive Crystals Precipitated from $Li_2S$—$P_2S_5$ Glasses", Adv. Mater, vol. 17, 2005, pp. 918-921.

Nagata et al., "Activation of Sulfur Active Material in an All-Solid-State Lithium-Sulfur Battery", J. Power Sources, vol. 263, 2014, pp. 141-144.

Nagata et al., "All-Solid-State Lithium-Sulfur Battery with High Energy and Power Densities at the Cell Level", Energy Technol., vol. 4, 2016, pp. 484-489.

Seino et al, "A Sulphide Lithium Super Ion Conductor is Superior to Liquid Ion Conductors for use in Rechargeable Batteries", Energy Environ. Sci., vol. 7, 2014, pp. 627-631.

Thackeray et al., "Electrical Energy Storage For Transportation-Approaching The Limits of, and Going Beyond, Lithium-Ion Batteries", Energy Environ. Sci. 2012, vol. 5 (7), pp. 7854-7863.

Wang et al., "A Gel-Ceramic Multi-Layer Electrolyte for Long-Life Lithium Sulfur Batteries", Chem. Commun. vol. 52, 2016, pp. 1637-1640.

Wang et al., "A Shuttle Effect Free Lithium Sulfur Battery Based on a Hybrid Electrolyte", Phys. Chem. Chem. Phys., vol. 16, 2014, pp. 21225-21229.

Wang et al., "Mechanism of Formation of $Li_7P_3S_{11}$ Solid Electrolytes through Liquid Phase Synthesis". Chem. Mater, vol. 30, 2018, pp. 990-997.

Xu et al., "Construction of All-Solid-State Batteries Based on a Sulfur-Graphene Composite and $Li_{9.54}Si_{1.74}P_{1.44}S_{11.7}Cl_{0.3}$ Solid Electrolyte", Chem.-Eur. J., vol. 23, 2017, pp. 13950-13956.

Xu et al., "Rational Coating of $Li_7P_3S_{11}$ Solid Electrolyte on $MoS_2$ Electrode for All-Solid-State Lithium Ion Batteries", J. Power Sources, vol. 374, 2018, pp. 107-112.

Yao et al., "High-Performance All-Solid-State Lithium-Sulfur Batteries Enabled by Amorphous Sulfur-Coated Reduced Graphene Oxide Cathodes", Adv. Energy Mater., vol. 7, 2017, 1602923, pp. 1-9.

Yu et al., "Electrode-Electrolyte Interfaces in Lithium-Based Batteries", Energy Environmental Science, 2018, vol. 11, pp. 527-543.

Yu et al., "Electrode-Electrolyte Interfaces in Lithium-Sulfur Batteries with Liquid or Inorganic Solid Electrolytes". Acc. Chem. Res. vol. 50, 2017, pp. 2653-2660.

Yu et al., "Synthesis, Structure and Electrochemical Performance of the Argyrodite $Li_6PS_5Cl$ Solid Electrolyte for Li-ion Solid State Batteries", Electrochim. Acta, vol. 215, 2016, pp. 93-99.

Zhang et al., "Advances in Lithium-Sulfur Batteries", Materials Science and Engineering: R: Reports, vol. 121, 2017, pp. 1-29.

Zhang et al., "$Fe_3S_4$@$Li_7P_3S_{11}$ Nanocomposites as Cathode Materials for All-Solid-State Lithium Batteries with Improved Energy Density and Low Cost",. J. Mater. Chem. A, vol. 5, 2017, pp. 23919-23925.

Zhang et al., "High Sulfur Loading Lithium-Sulfur Batteries Based on Upper Current Collector Electrode with Lithium-ion Conductive Polymer", J. Mater. Chem. A, vol. 5, 2017, 6 pages.

\* cited by examiner

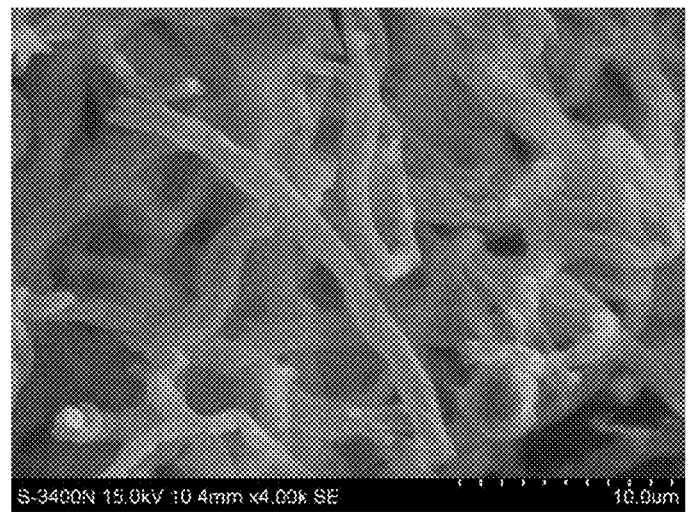
FIG. 3
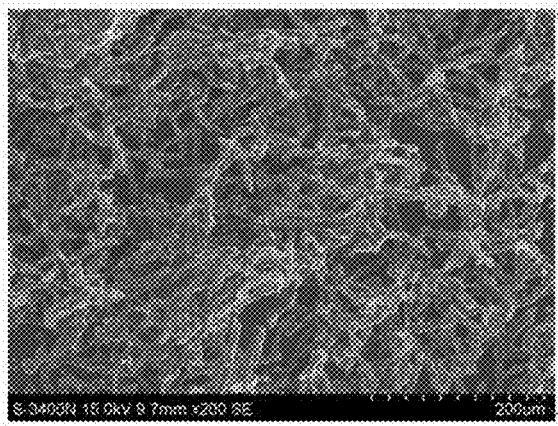 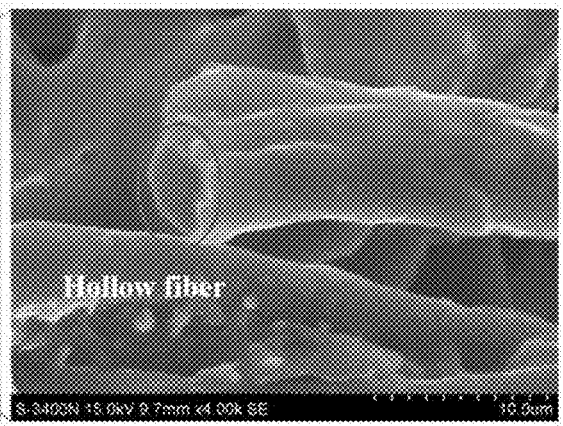
FIG. 4A    FIG. 4B

COMPOSITE CATHODES FOR SOLID-STATE LITHIUM SULFUR BATTERIES AND METHODS OF MANUFACTURING THEREOF

BACKGROUND

This application claims the benefit of priority under 35 U.S.C. § 119 of Chinese Patent Application Serial No. 201911250277.9, filed on Dec. 9, 2019, the content of which is relied upon and incorporated herein by reference in its entirety.

1. Field

This disclosure relates to composite cathodes for solid-state lithium sulfur (Li—S) batteries and methods of manufacturing thereof.

2. Technical Background

Lithium-sulfur (Li—S) batteries are promising candidates for replacing conventional lithium-ion batteries since they are high energy, low cost, and industrially scalable. For example, Li—S cell chemistries have a high energy density (e.g., 2600 W·h·kg$^{-1}$) and theoretical specific capacity (e.g., 1675 mA·h·g$^{-1}$), and a natural abundance of the environmentally friendly sulfur element.

Conventional Li—S batteries are already reaching their limits in terms of safety and durability, posing a challenge for large-scale application in electrical equipment. For example, despite great promise, successful implementation of conventional Li—S batteries based on organic liquid electrolytes are hindered by short cycling life, caused mainly by the shuttling of highly soluble polysulfides in liquid electrolyte and lithium dendrites growth. In other words, the solubility of long-chain polysulfides produced during battery discharging in conventional organic electrolytes results in their migration from the cathode to the lithium (Li) anode, which induces unwanted side reactions, a lowered Coulombic efficiency, and a continuous loss of the active cathode material. Another challenge is the electronically and ionically insulating nature of elemental sulfur (when used as a component of the active material in the cathode), which requires a large amount of conducting additives (e.g., carbon materials) in the composite cathode, thereby significantly reducing practical capacity (e.g., energy density) and applicability.

The present application discloses improved cathodes and methods of formation thereof for solid-state lithium sulfur (Li—S) battery applications.

SUMMARY

In some embodiments, a lithium-sulfur battery, comprises: a substrate; a composite cathode disposed on the substrate; a solid-state electrolyte disposed on the composite cathode; and a lithium anode disposed on the solid-state electrolyte, wherein the composite cathode comprises: active elemental sulfur, conductive carbon, and sulfide electrolyte, and the sulfide electrolyte is uniformly coated on at least one surface of the conductive carbon.

In one aspect, which is combinable with any of the other aspects or embodiments, the solid-state electrolyte comprises at least one of: Li$_{6.4}$La$_3$Zr$_{1.4}$Ta$_{0.6}$O$_{12}$ (LLZTO), Li$_{10}$GeP$_2$S$_{12}$, Li$_{1.5}$Al$_{0.5}$Ge$_{1.5}$(PO$_4$)$_3$, Li$_{1.4}$Al$_{0.4}$Ti$_{1.6}$(PO$_4$)$_3$, Li$_{0.55}$La$_{0.35}$TiO$_3$, interpenetrating polymer networks of poly (ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed Li$_3$PS$_4$, Li$_6$PS$_5$Cl, or combinations thereof.

In one aspect, which is combinable with any of the other aspects or embodiments, the sulfide electrolyte comprises at least one of: Li$_{10}$GeP$_2$S$_{12}$, β-Li$_3$PS$_4$, Li$_{9.6}$P$_3$S$_{12}$, Li$_3$PS$_4$, and Li$_7$P$_3$S$_{11}$.

In one aspect, which is combinable with any of the other aspects or embodiments, a main phase of the sulfide electrolyte is Li$_7$P$_3$S$_{11}$.

In one aspect, which is combinable with any of the other aspects or embodiments, the sulfide electrolyte comprises a x(Li$_2$S)-y(P$_2$S$_5$) electrolyte material, where x and y are greater than one.

In one aspect, which is combinable with any of the other aspects or embodiments, the conductive carbon comprises: nanoparticles, nanowires, nanofibers, nanorods, nanotubes, nanospheres, graphene, carbon black, carbonized cotton fiber, Super P, Ketjen black, or combinations thereof.

In one aspect, which is combinable with any of the other aspects or embodiments, the conductive carbon comprises carbonized cotton fiber.

In one aspect, which is combinable with any of the other aspects or embodiments, the carbonized cotton fiber is a hollow fiber with at least one of: a fiber diameter of about 10 μm, or an average fiber length of about 100 μm to 200 μm.

In one aspect, which is combinable with any of the other aspects or embodiments, the battery is configured to exhibit at least one of: an impedance below 25 Ω·cm$^2$; a total capacity of 32.8 mAh or 22 mAh/cm$^2$ after an operation time of at least 600 hours.

In one aspect, which is combinable with any of the other aspects or embodiments, sulfur loading in the composite cathode at the composite cathode-solid-state electrolyte interface is at least 50 mg/cm$^2$.

In some embodiments, a lithium-sulfur battery, comprises: a composite cathode disposed on the substrate; wherein: the composite cathode comprises: active elemental sulfur, conductive carbon, and sulfide electrolyte, the sulfide electrolyte is uniformly coated on at least one surface of the conductive carbon, and the conductive carbon is a carbonized cotton fiber.

In one aspect, which is combinable with any of the other aspects or embodiments, the sulfide electrolyte comprises at least one of: Li$_{10}$GeP$_2$S$_{12}$, β-Li$_3$PS$_4$, Li$_{9.6}$P$_3$S$_{12}$, Li$_3$PS$_4$, and Li$_7$P$_3$S$_{11}$.

In one aspect, which is combinable with any of the other aspects or embodiments, the carbonized cotton fiber is a hollow fiber with at least one of: a fiber diameter of about 10 μm, or an average fiber length of about 100 μm to 200 μm.

In one aspect, which is combinable with any of the other aspects or embodiments, the battery is configured to exhibit at least one of: an impedance below 25 Ω·cm$^2$; a total capacity of 32.8 mAh or 22 mAh/cm$^2$ after an operation time of at least 600 hours.

In one aspect, which is combinable with any of the other aspects or embodiments, the battery further comprises: a solid-state electrolyte disposed on the composite cathode, wherein: sulfur loading in the composite cathode at the composite cathode-solid-state electrolyte interface is at least 50 mg/cm$^2$.

In some embodiments, a method of forming a composite cathode for a lithium-sulfur battery, comprises: synthesizing dispersed carbon fiber from cotton to form carbonized dispersed cotton fiber (CDCF) powder; in-situ coating of the CDCF with an electrolyte component to form a composite powder; and mixing active elemental sulfur powder with the composite powder to form the composite cathode.

In one aspect, which is combinable with any of the other aspects or embodiments, the electrolyte component comprises at least one of: $Li_{10}GeP_2S_{12}$, $\beta$-$Li_3PS_4$, $Li_{9.6}P_3S_{12}$, $Li_3PS_4$, and $Li_7P_3S_{11}$.

In one aspect, which is combinable with any of the other aspects or embodiments, the electrolyte component comprises $Li_7P_3S_{11}$.

In one aspect, which is combinable with any of the other aspects or embodiments, the step of synthesizing comprises: hydrolyzing the cotton in acid to form dispersed cotton fiber (DCF); and heating the DCF at a temperature of at least 1000° C. to form the CDCF powder.

In one aspect, which is combinable with any of the other aspects or embodiments, the step of coating comprises: forming a precursor powder comprising lithium sulfide ($Li_2S$) and phosphorus pentasulfide ($P_2S_5$); depositing the precursor powder on the CDCF; and reacting $Li_2S$ with $P_2S_5$ on the CDCF to form the composite powder.

In one aspect, which is combinable with any of the other aspects or embodiments, the step of depositing comprises: dissolving the precursor powder into an organic solvent containing CDCF powder; and evaporating the organic solvent to form a precursor powder-coated CDCF, wherein the dissolving and evaporating are conducted at a temperature below 100° C.

In one aspect, which is combinable with any of the other aspects or embodiments, a weight ratio of organic solvent to a combined mass of $Li_2S$ and $P_2S_5$ to a mass of CDCF during the step of dissolving is in a range of 40:2:1 to 80:2:1, respectively.

In one aspect, which is combinable with any of the other aspects or embodiments, the step of reacting comprises: heating the precursor powder-coated CDCF to a temperature of at least 225° C.

In one aspect, which is combinable with any of the other aspects or embodiments, the step of mixing comprises: grinding active elemental sulfur powder with the composite powder to form a sieved composite; and heating the sieved composite to a temperature of at least 155° C.

In some embodiments, a composite cathode is formed by a method disclosed herein.

BRIEF DESCRIPTION OF THE DRAWINGS

The disclosure will become more fully understood from the following detailed description, taken in conjunction with the accompanying figures, in which:

FIG. 3 illustrates a scanning electron microscopy (SEM) image of carbonized cotton fiber after 1000° C. heat treatment, according to some embodiments.

FIGS. 4A and 4B illustrate SEM images of cotton carbon fiber after in-situ coating of $Li_7P_3S_{11}$ electrolyte, according to some embodiments.

DETAILED DESCRIPTION

Figure 1:
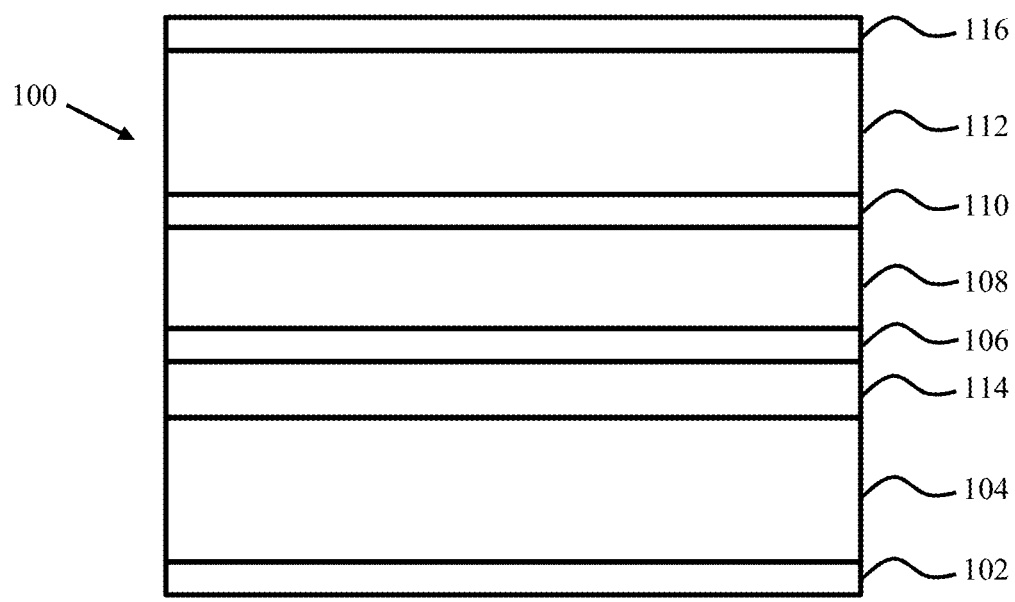
FIG. 1 illustrates a general structure of a solid-state lithium sulfur (Li—S) battery, according to some embodiments.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments. It should be understood that the present application is not limited to the details or methodology set forth in the description or illustrated in the figures. It should also be understood that the terminology is for the purpose of description only and should not be regarded as limiting.

Additionally, any examples set forth in this specification are illustrative, but not limiting, and merely set forth some of the many possible embodiments of the claimed invention. Other suitable modifications and adaptations of the variety of conditions and parameters normally encountered in the field, and which would be apparent to those skilled in the art, are within the spirit and scope of the disclosure.

Aimed at solving the problems defined above, one approach uses solid state electrolytes (e.g., oxide ceramic electrolytes or sulfide glass-ceramic electrolytes). However, one problem of such cell configurations is the large impedance caused by the solid-solid contact among particles in cathodes and between cathodes and solid electrolytes. Addition of liquid electrolyte into the cathode creates severe polysulfide shuttling issues, since polysulfides dissolve into the liquid electrolyte, causing capacity fading. Thus, this approach is impractical.

An alternative approach involves blending sulfide electrode materials (e.g., $Li_2S$—$P_2S_5$ and derivatives) into the sulfur cathode of solid-state Li—S batteries by ball-milling together with conductive carbon to impart the cathode with high (lithium) ion conductivity and improved (though still high) impedance. These sulfide electrode materials may be very soft, and easily densified by cold processing. However, this too, proves impractical, as very high external pressure must be applied to the cell to ensure close contact of all solid particles during cell cycling. In other words, high external pressures are necessary to ensure that the sulfur active material is in close contact with the ion conductor and the electron conductor and because isolated granular conductive carbon may not form conductive networks within the composite cathode.

The present disclosure relates to solid-state Li—S batteries comprising a composite cathode having small internal impedance and which is formed without high external pressures or liquid electrolyte addition. In particular, the present disclosure describes a composite cathode having a conductive carbon component (e.g., carbon fiber) functioning as a conductive skeleton, and a sulfide electrolyte component coated onto a surface of the conductive carbon using, for example, a liquid-phase process. Thereafter, elemental sulfur was mixed with the sulfide electrolyte-coated conductive carbon and heat treated to form a composite cathode having a close inner contact and without requiring a high pressure system. The conductive skeleton is able to conduct electrons rapidly, while the sulfide electrolyte coated thereon allows rapid conduction of lithium ions. The active elemental sulfur is able to form sufficient contact with both the electron conductor (conductive carbon component) and the ion conductor (sulfide electrolyte component).

FIG. 1 illustrates a general structure of a solid-state lithium sulfur (Li—S) battery, according to some embodiments. It will be understood by those of skill in the art that the processes described herein can be applied to other configurations of solid-state lithium sulfur (Li—S) battery structures.

In some embodiments, battery 100 may include a substrate 102 (e.g., a current collector), a sulfur electrode (e.g., cathode) 104 disposed on the substrate, an optional coating layer 114 disposed on the cathode, an optional first interlayer 106 disposed on the coating layer, a solid-state electrolyte 108 disposed on the first interlayer, an optional second interlayer 110 disposed on the electrolyte, a lithium electrode (e.g., anode) 112 disposed on the second interlayer, and a second current collector 116 disposed on the anode. These can be disposed horizontally in relation to each other or vertically.

In some examples, the substrate 102 may a current collector including at least one of three-dimensional nickel (Ni) foam, carbon fiber, foils (e.g., aluminum, stainless steel, copper, platinum, nickel, etc.), or a combination thereof.

In some examples, the interlayer 106 and 110 may be independently chosen from at least one of carbon-based interlayers (e.g., interlinked freestanding, micro/mesopore containing, functionalized, biomass derived), polymer-based interlayers (e.g., PEO, polypyrrole (PPY), polyvinylidene fluoride, etc.), metal-based (e.g., Ni foam, etc.), or a combination thereof. In some examples, at least one of interlayers 106 or 110 may be $PEO_{18}LiTFSI$-10% $SiO_2$-10% IL (combination of polyethylene oxide (PEO), bis(trifluoromethane) sulfonimide lithium salt ($LiN(CF_3SO_2)_2$, or LiTFSI), $SiO_2$ nanoparticles and ionic liquid (IL)).

In some examples, solid-state electrolyte 108 may be used to address common safety concerns such as leakage, poor chemical stability, and flammability often seen in Li—S batteries employing liquid electrolytes. Moreover, solid-state electrolytes can also suppress polysulfide shuttling from the cathode to the anode, thereby leading to improved cathode utilization and a high discharge capacity and energy density. In some examples, the solid-state electrolyte may include at least one of $Li_{6.4}La_3Zr_{1.4}Ta_{0.6}O_{12}$ (LLZTO), $Li_{10}GeP_2S_{12}$, $Li_{1.5}Al_{0.5}Ge_{1.5}(PO_4)_3$, $Li_{1.4}Al_{0.4}Ti_{1.6}(PO_4)_3$, $Li_{0.55}La_{0.35}TiO_3$, interpenetrating polymer networks of poly(ethyl acrylate) (ipn-PEA) electrolyte, three-dimensional ceramic/polymer networks, in-situ plasticized polymers, composite polymers with well-aligned ceramic nanowires, PEO-based solid-state polymers, flexible polymers, polymeric ionic liquids, in-situ formed $Li_3PS_4$, $Li_6PS_5Cl$, or combinations thereof. Methods of formation of the electrolyte 108 are described in the Examples below.

In some examples, the anode 112 may comprise lithium (Li) metal. In some examples, the battery may include at least one anode protector such as electrolyte additives (e.g., $LiNO_3$, lanthanum nitrate, copper acetate, $P_2S_5$, etc.), artificial interfacial layers (e.g., $Li_3N$, $(CH_3)_3SiCl$, $Al_2O_3$, LiAl, etc.), composite metallics (e.g., $Li_7B_6$, Li-rGO (reduced graphene oxide), layered Li-rGO, etc.), or combinations thereof. In some examples, a thin layer of metal (e.g., Au) may be ion-sputter coated to form a contact interface between the anode 112 and first interlayer 106 or between the anode and solid-state electrolyte 108. In some examples, a thin layer of silver (Ag) paste may be brushed to a surface of the solid-state electrolyte 108 to form a close contact between the anode 112 and solid-state electrolyte 108.

In some examples, the coating layer 114 may comprise at least one of carbon polysulfides (CS), polyethylene oxides (PEO), polyaniline (PANI), polypyrrole (PPY), poly(3,4-ethylenedioxythiophene) (PEDOT), polystyrenesulfonic acid (PSS), polyacrylonitrile (PAN), polyacrylic acid (PAA), polyallylamine hydrochloride (PAH), poly(vinylidene fluoride-co-hexafluoropropylene) (P(VdF-co-HFP)), poly(methylmethacrylate) (PMMA), polyvinylidene fluoride (PVDF), poly(diallyldimethyl ammonium) bis(trifluoromethanesulfonyl)imide (TFSI) (PDDATFSI), or combinations thereof, and at least one lithium salt (e.g., bis(trifluoromethane) sulfonimide lithium salt ($LiN(CF_3SO_2)_2$)(LiTFSI), lithium perchlorate, lithium bis(oxalato) borate (LiBOB), lithium bis(fluorosulfonyl)imide (LiFSI), lithium trifluoromethanesulfonate ($LiCF_3SO_3$) (LiTf), lithium bis(trifluoromethanesulfonimide) ($Li(C_2F_5SO_2)_2N$) (LiBETI), or combinations thereof). In some examples, the coating layer may additionally comprise at least one of, or at least two of, or at least three of nitrogen, carbon, cobalt, titanium, tantalum, and tungsten.

Description of the sulfur cathode 104 and methods of formation are described in the Examples below.

EXAMPLES

Figure 2:
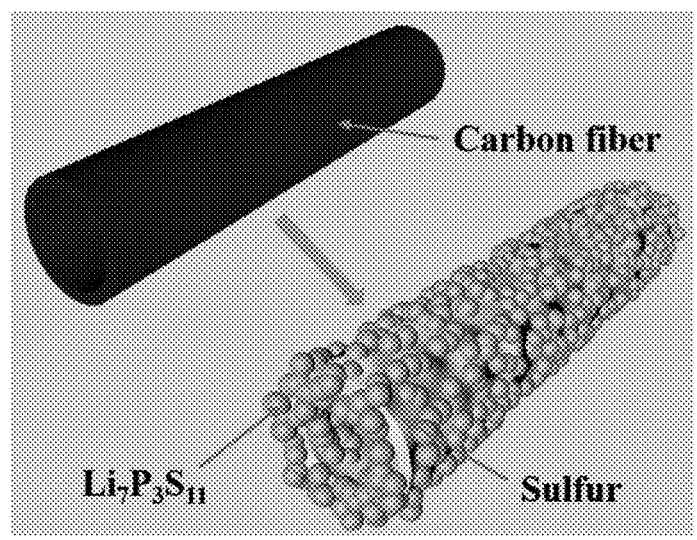
FIG. 2 illustrates a schematic diagram of a composite sulfur cathode with carbon fiber, $Li_7P_3S_{11}$ electrolyte, and sulfur, according to some embodiments.

FIG. 2 illustrates a schematic diagram of a composite sulfur cathode, according to some embodiments, with (A) a carbon fiber conductive carbon component (after synthesis Step 1, below), and (B) a carbon fiber conductive carbon component coated with a $Li_7P_3S_{11}$ electrolyte component and an active elemental sulfur component (after synthesis Steps 2 and 3, below). With a liquid-phase coating process, the in-situ formed electrolyte coating layer exhibits close contact with the carbon fiber skeleton.

Example 1

Preparation of Composite Cathode

Generally, preparation of the composite sulfur cathode includes three steps: (1) synthesis of dispersed carbon fiber (i.e., conductive carbon component) from cotton to form carbonized dispersed cotton fiber (CDCF); (2) in-situ coating of the carbon fiber with $Li_7P_3S_{11}$ (i.e., electrolyte component) to form CDCF@$Li_7P_3S_{11}$ composite powder; and (3) mixing active elemental sulfur powder with the CDCF@$Li_7P_3S_{11}$ composite powder to form the composite sulfur cathode (CDCF@S@$Li_7P_3S_{11}$). In some examples, the conductive carbon component is also contemplated as being Super P, Ketjen black, or combinations thereof.

Step 1—Synthesis of Dispersed Carbon Fiber (i.e., Conductive Carbon Component) From Cotton to Form Carbonized Dispersed Cotton Fiber (CDCF)

Medically-absorbent cotton (3 g) is immersed into 40 mL of deionized (DI) water dissolved with 20 mL of concentrated sulfuric acid (c-$H_2SO_4$) and stirred for 10 min to form dispersed cotton fiber (DCF) (i.e., hydrolyzed cotton). The obtained slurry-like mixture is filtered, thoroughly washed with DI water and ethyl alcohol, and then vacuum-dried overnight at 70° C. The dried cotton fiber is heated (i.e., carbonization process) in a quartz crucible at 1000° C. (ramp rate of about 5° C./min) for about two hours in an inert (e.g., argon) atmosphere and then naturally cooled to room temperature to obtain carbonized dispersed cotton fiber (CDCF). CDCF may be preferred in some applications for its highly-carbonized microstructure which leads to higher electron conductivities. Moreover, its hollow structure results in close contact with the electrolyte component and active elemental sulfur material.

Step 2—In-Situ Coating of the CDCF with $Li_7P_3S_{11}$ (i.e., Electrolyte Component) to Form CDCF@$Li_7P_3S_{11}$ Composite Powder Due to the sensitivity of sulfide electrolyte to moisture, all preparation processes are performed in an argon (Ar)-filled glovebox. $Li_7P_3S_{11}$ powder is synthesized from $Li_2S$ (Alfa Aesar, 99.9%) and $P_2S_5$ (Sigma-Aldrich, 99%) in acetonitrile (ACN) (Selectilyte BASF, battery grade).

Initially, CDCF powder synthesized in Step 1 is added into ACN solvent and stirred thoroughly. Thereafter, both lithium sulfide ($Li_2S$) and phosphorus pentasulfide ($P_2S_5$) are dissolved in the CDCF-containing ACN solvent at a molar ratio of 7:3 and then stirred for 24 hours at 70° C. The weight ratio of ACN solvent to the combined mass of $Li_2S$ and $P_2S_5$ to the mass of CDCF is about (40-80):2:1, respectively. During this mixing, gray precipitates form in solution. The solvent is then evaporated in vacuum at 50° C. to avoid liquid boiling to obtain CDCF deposited with $Li_2S/P_2S_5$ precursors (i.e., $Li_2S$—$P_2S_5$ coated carbon fibers). After a subsequent heating step under vacuum at 80° C. for 6 hours to remove residual solvent, the fully-dried powder is heated at 225° C. in an inert (e.g., argon) atmosphere to promote in-situ reaction between $Li_2S$ and $P_2S_5$ to form a $Li_7P_3S_{11}$ crystallized phase. The final composite powder is hereinafter referred to as CDCF@$Li_7P_3S_{11}$.

This liquid-phase process provides uniform mixing of the two precursors ($Li_2S$ and $P_2S_5$), thereby promoting formation of $Li_7P_3S_{11}$ with high ionic conductivity.

In some examples, the electrolyte component may comprise at least one of $Li_{10}GeP_2S_{12}$, $\beta$-$Li_3PS_4$, $Li_{9.6}P_3S_{12}$, $Li_3PS_4$, and $Li_7P_3S_{11}$. In some examples, the electrolyte component may comprise a x($Li_2S$)-y($P_2S_5$) electrolyte material, where x and y are greater than one.

Step 3—Mixing Active Elemental Sulfur Powder with CDCF@$Li_7P_3S_{11}$ Composite Powder to Form a Composite Sulfur Cathode (CDCF@S@$Li_7P_3S_{11}$)

In order to mix the active elemental sulfur powder and the CDCF@$Li_7P_3S_{11}$ composite powder of Step 2 at a weight ratio of 2:(2-4), respectively, the mixture is hand-ground in an agate mortar for about 1 hour to form a sieved composite. After grinding, the sieved composite is then sealed in a crucible and heated at 155° C. for 12 hours under vacuum. The final composite sulfur cathode is hereinafter referred to as CDCF@S@$Li_7P_3S_{11}$.

Example 2

Preparation of $Li_6PS_5Cl$ Electrolyte

Dry LiCl, $P_2S_5$, and $Li_2S$ are weighed with molar ratio of 2:1:5, respectively. Initially, LiCl and $P_2S_5$ particles were thoroughly ground and mixed uniformly. Thereafter, $Li_2S$ is added and ground for 15 minutes to ensure sufficient mixing of the three raw materials. Then, the powder mixture comprising all three of LiCl, $P_2S_5$, and $Li_2S$ is heat-treated at 550° C. (ramp rate of 5° C./min) for 6 hours in an inert atmosphere. The obtained agglomerate is pulverized and ground to obtain a $Li_6PS_5Cl$ powder.

Example 3

Battery Assembly

Figure 6:
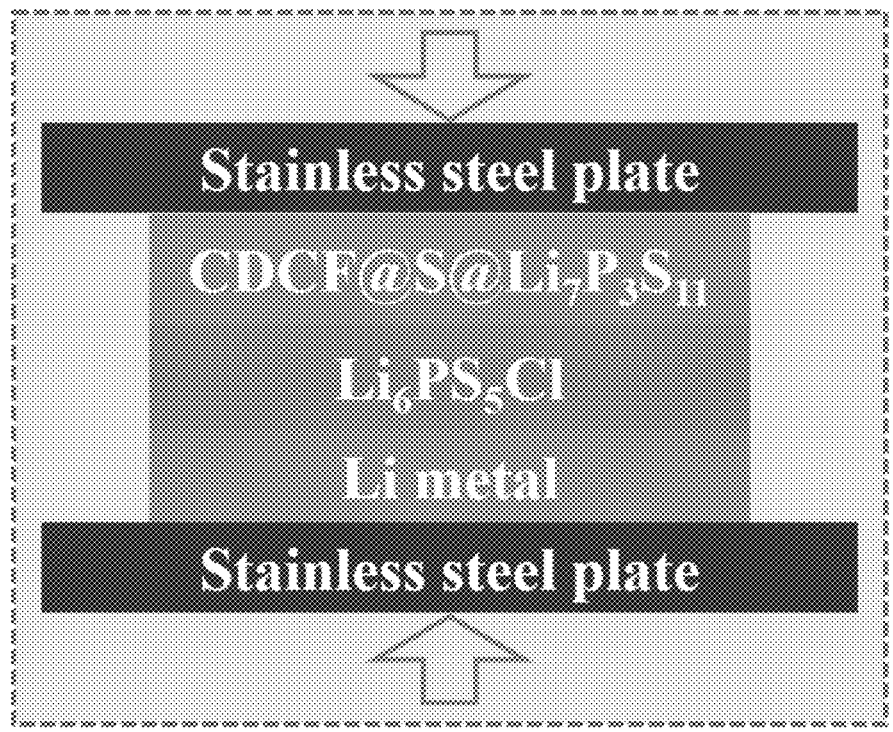
FIG. 6 illustrates a schematic diagram of an all-solid-state Li—S battery based on a composite cathode and Li6PS5C1 electrolyte, according to some embodiments.

FIG. 6 illustrates a schematic diagram of an all-solid-state Li—S battery based on a composite cathode and $Li_6PS_5Cl$ electrolyte prepared by the processes described herein, according to some embodiments.

The CDCF@S@$Li_7P_3S_{11}$ composite cathode (working electrode) and solid electrolyte $Li_6PS_5Cl$ are placed in a stainless steel mold (14 mm diameter) and pressed together with a pressure of 100 MPa at room temperature. A lithium metal foil is placed on a surface of the solid electrolyte side of the bilayer pellet, and again, a pressure of 100 MPa is applied to obtain a tri-layered CDCF@S@$Li_7P_3S_{11}$ composite cathode—$Li_6PS_5Cl$ solid electrolyte—Li metal anode pellet. The tri-layered pellet is then sandwiched with two stainless-steel current collectors. All cell preparation processes are conducted in a dry argon-filled glovebox.

Thus, the composite cathode (of Example 1) is positioned on a first side of the $Li_6PS_5Cl$ solid electrolyte (of Example 2) and the Li metal anode is positioned on a second side of the $Li_6PS_5Cl$ solid electrolyte, such that the first side is opposite to the second side.

Sulfur loading in the composite cathode on the electrolyte surface is in a range of about 3 mg/cm$^2$ to 6 mg/cm$^2$, or 6 mg/cm$^2$ to 15 mg/cm$^2$, or 15 mg/cm$^2$ to 25 mg/cm$^2$, or 25 mg/cm$^2$ to 40 mg/cm$^2$, or 40 mg/cm$^2$ to 60 mg/cm$^2$, or 60 mg/cm$^2$ to 80 mg/cm$^2$, or 80 mg/cm$^2$ to 100 mg/cm$^2$, or any value or range disclosed therein. The final battery assembly is a cylindrical-type battery assembly. One structure of the lithium sulfur battery is shown in FIG. 6.

In some examples, the formed battery exhibits an impedance below 250 $\Omega \cdot cm^2$, or below 225 $\Omega \cdot cm^2$, or below 200 $\Omega \cdot cm^2$, or below 175 $\Omega \cdot cm^2$, or below 150 $\Omega \cdot cm^2$, or below 125 $\Omega \cdot cm^2$, or below 100 $\Omega \cdot cm^2$, or below 75 $\Omega \cdot cm^2$, or below 50 $\Omega \cdot cm^2$, or below 25 $\Omega \cdot cm^2$, or below 10 $\Omega \cdot cm^2$, or below 5 $\Omega \cdot cm^2$, or any value or range disclosed therein. In some examples, the formed battery exhibits a reversible capacity of at least 500 mA/hg$_S^1$, or at least 600 mA/hg$_S^1$, or at least 700 mA/hg$_S^1$, or at least 800 mA/hg$_S^1$, or at least 900 mA/hg$_S^1$, or at least 1000 mA/hg$_S^1$, or any value or range disclosed therein, at first cycle. In some examples, the formed battery exhibits a capacity retention of at least 40%, or at least 50%, or at least 60%, or at least 70%, or at least 80%, or at least 90%, or at least 95%, or at least 99%, or any value or range disclosed therein, after 50 cycles.

Example 4

Characterization Studies

The composite cathode used in characterization studies (described below) may be prepared as described in Steps 1-3 of Example 1. Moreover, the electrolyte and battery assembly may be prepared as described in Examples 2 and 3, respectively. Specifically, sulfur loading in the tested composite cathode on the electrolyte surface was about 50 mg/cm$^2$, and the all-solid-state battery was tested at 60° C. with a current of 0.05 mA (or current density of 0.033 mA/cm$^2$).

The full battery was constructed in a cylindrical-type battery assembly with a diameter of 20 mm and a height of 3.2 mm.

Comparative Example 1

The cathode of the battery is prepared as in Steps 1-3 of Example 1, with the exception of the in-situ coating process of Step 2.

For example, after preparation of carbonized dispersed cotton fiber (CDCF) (e.g., Step 1 described above), pure $Li_7P_3S_{11}$ electrolyte is prepared separate from the CDCF as follows.

In an argon (Ar)-filled glovebox, lithium sulfide ($Li_2S$) and phosphorus pentasulfide ($P_2S_5$) are dissolved in acetonitrile (CAN) solvent and then stirred for 24 hours at 70° C. During this mixing, gray precipitates form in solution. The solvent is then evaporated in vacuum at 50° C. After a subsequent heating step under vacuum at 80° C. for 6 hours to remove residual solvent, the fully-dried powder is heated at 225° C. in an inert (e.g., argon) atmosphere to promote reaction between $Li_2S$ and $P_2S_5$ to form a $Li_7P_3S_{11}$ crystallized phase. Thereafter, the CDCF and $Li_7P_3S_{11}$ are combined and thoroughly ground.

The ground CDCF and $Li_7P_3S_{11}$ mixture is then processed as in Step 3 (described above) to form the final Comparative Example 1 composite cathode, hereinafter referred to as to form h-CDCF@S@$Li_7P_3S_{11}$.

The $Li_6PS_5Cl$ electrolyte was prepared as in Example 2 above, with the final battery construction prepared as in Example 3. For Comparative Example 1, the tri-layered pellet comprises h-CDCF@S@$Li_7P_3S_{11}$ composite cathode—$Li_6PS_5Cl$ solid electrolyte—Li metal anode pellet. With a sulfur loading of about 50 mg/cm², the all-solid-state battery of Comparative Example 1 is tested at 60° C. with a current density of 0.05 mA.

Characterization of Example 4 and Comparative Example 1

Morphology and Phase Analysis

SEM images are obtained by scanning electron microscope (Hitachi JSM 6700). Element mapping images are characterized by an energy dispersive spectrometer (EDS) affiliated with the HITACHI SEM.

Raman spectroscopy is conducted using a Thermo Scientific DXR in order to verify phosphorus-sulfide anion structures in tested samples.

Electrochemical Impedance Spectroscopy

Electrochemical impedance spectroscopy (EIS) is conducted with an Autolab electrochemical workstation (ECO CHEMIE B.V., Netherlands) with a Frequency Response Analyzer.

Electrochemical Performance

Charge and discharge curves for solid state lithium sulfur batteries are measured with LAND CT2001A battery test system (China) in a voltage range from 3V to 1.5V under a current density of 0.05 mA/cm² at 60° C.

Turning now to the figures, FIG. 3 illustrates a scanning electron microscopy (SEM) image of carbonized cotton fiber morphology after 1000° C. heat treatment (after Step 1 for both Example 4 and Comparative Example 1). As is exemplified, a uniform structure is observed and indicates uniform dispersion of the carbon fiber in solution. A uniform dispersion of carbon fiber in solution allows for a satisfactory coating (e.g., as in FIGS. 4A and 4B), which creates excellent contact between the carbonized carbon fiber and electrolyte component and/or the carbonized carbon fiber and active elemental sulfur material, leading to enhanced electrochemical performance. The carbonized cotton fiber is able to retain its hollow structure, with a fiber diameter of about 10 μm and an average fiber length of about 100 μm to 200 μm.

FIGS. 4A and 4B illustrate SEM images of cotton carbon fiber after in-situ coating of $Li_7P_3S_{11}$ electrolyte (after Step 2 for Example 4). In other words, FIGS. 4A and 4B show a cross-section of the interior of the cotton carbon fiber after in-situ coating of $Li_7P_3S_{11}$ electrolyte. Because no $Li_7P_3S_{11}$ electrolyte particles are observed, this indicates that most all of the $Li_7P_3S_{11}$ electrolyte material is uniformly coated on the surface of the carbon fiber. In addition, the hollow structure of carbon fiber is still visible. Because of this hollow structure of the carbon fiber, the carbon fiber has a large contact surface with the electrolyte component and the active elemental sulfur material, which greatly decreases internal impedance of the battery.

Thus, as is seen by FIGS. 3-4B, in-situ coating of $Li_7P_3S_{11}$ electrolyte with the cotton carbon fiber results in a uniform structure having a close contact between the electrolyte coating layer and the carbon fiber skeleton, thereby enabling desired electrochemical performance (e.g., decreased internal impedance, increased stability, increased discharge capacity) of the full battery assembly.

Figures 5A, 5B:
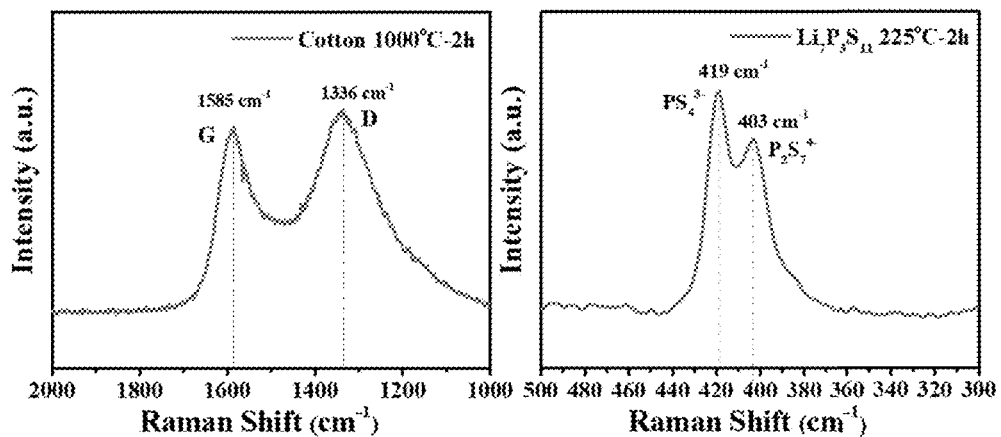
FIGS. 5A and 5B illustrate Raman spectra of cotton carbon fiber after 1000° C. heat treatment (after Step 1) and coated with $Li_7P_3S_{11}$ electrolyte after 225° C. heat treatment (after Step 2), respectively, according to some embodiments.

FIGS. 5A and 5B illustrate Raman spectra of cotton carbon fiber after 1000° C. heat treatment (after Step 1) and coated with $Li_7P_3S_{11}$ electrolyte after 225° C. heat treatment (after Step 2), respectively. In FIG. 5A, the G peak at 1585 cm$^{-1}$ and the D peak at 1336 cm$^{-1}$ indicate that a certain degree of graphitized carbon appears in the cotton carbon fiber after high temperature carbonization, which is favorable for rapid conduction of electrons. In FIG. 5B, the two peaks at 403 cm$^{-1}$ and 419 cm$^{-1}$ may be ascribed to the stretching of $P_2S_7^{4-}$ and $PS_4^{3-}$, respectively. The intensity ratio of these two peaks confirms that the obtained electrolyte is $Li_7P_3S_{11}$. Because no $P_2S_6^{4-}$ peak is observed at 380 cm$^{-1}$, which is a peak characteristic of low ionic conductive phase $Li_4P_2S_6$, high-conductivity $Li_7P_3S_{11}$ is the main phase in the final sulfide electrolyte, leading to a higher conductivity.

Figure 7:
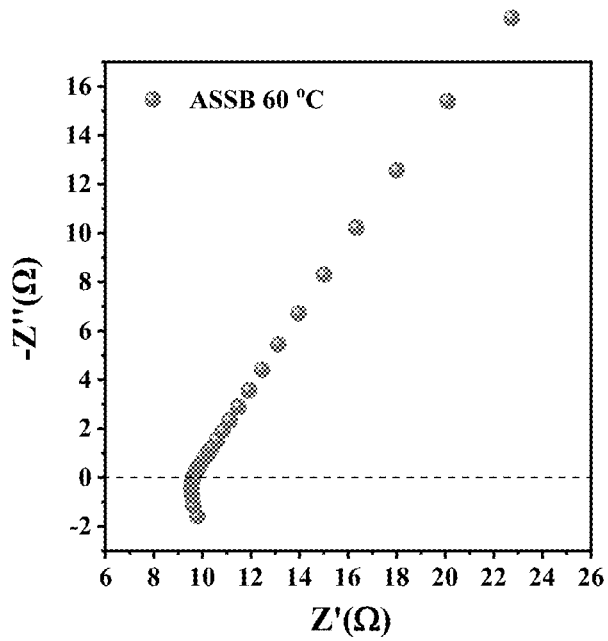
FIG. 7 illustrates an electrochemical impedance spectroscopy (EIS) spectrum of an all-solid-state battery at 60° C., according to some embodiments.

FIG. 7 illustrates an electrochemical impedance spectroscopy (EIS) spectrum of an all-solid-state battery at 60° C. (for Example 4). The impedance of the entire cell is only 10Ω. This low impedance may be ascribed to (A) high Li-ion conductivity of $Li_6PS_5Cl$ electrolyte at 60° C. and (B) the pressure applied to the cell which significantly reduce interface impedance. In comparison, impedance of the cell resulting from Comparative Example is greater 100Ω.

Figure 8:
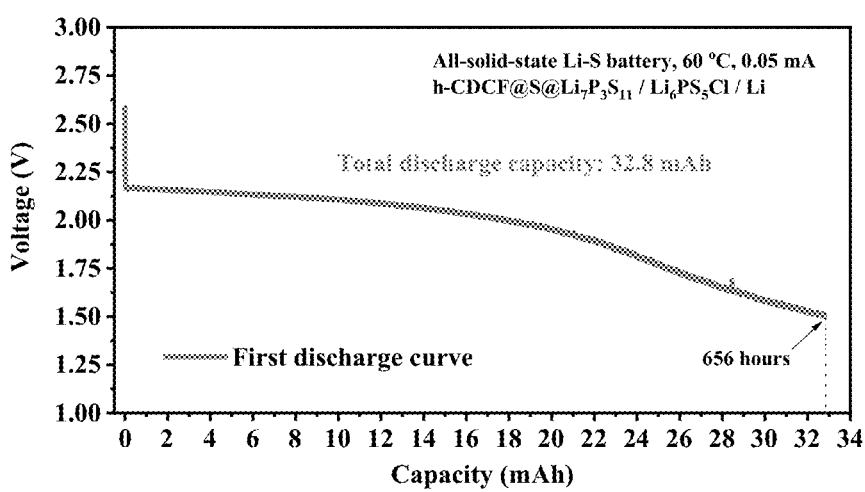
FIG. 8 illustrates a first discharge curve of a full battery working at 60° C., according to some embodiments.
Figure 9:
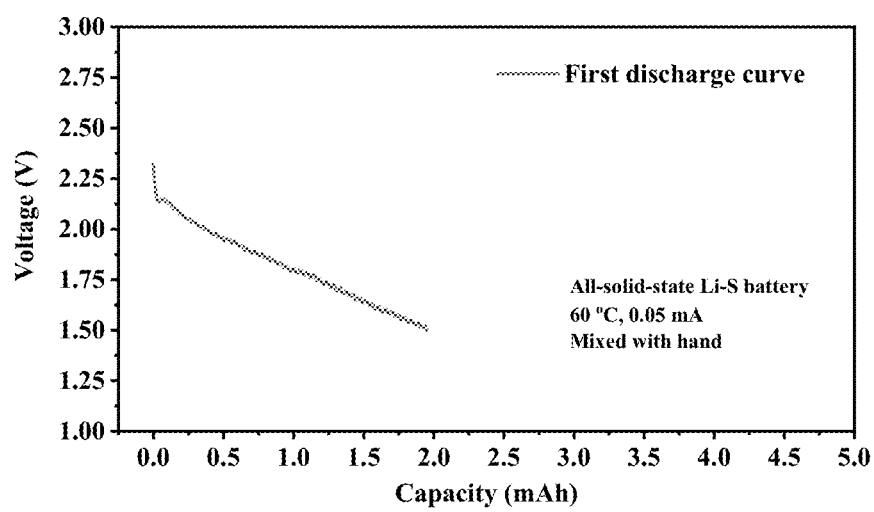
FIG. 9 illustrates a first discharge curve of a full battery (mixing manually) working at 60° C., according to some embodiments.

FIG. 8 illustrates a first discharge curve of a full battery working at 60° C., with a current of 0.05 mA or current density of 0.033 mA/cm². After prolonged operation of the cell—in this case, for 656 hours—the first discharge process exhibited a total capacity of 32.8 mAh, or 21.9 mAh/cm², which is much higher than conventional battery technologies. In comparison, the total capacity of conventional batteries with similar usage is about 0.2-8 mAh/cm². For example, compare with FIG. 9, which illustrates a first discharge curve of a full battery assembled with the h-CDCF@S@$Li_7P_3S_{11}$ composite cathode (of Comparative Example 1), the full battery operating at 60° C., with a current of 0.05 mA. Utilizing the same testing conditions as the battery of FIG. 8, the battery comprising the h-CDCF@S@$Li_7P_3S_{11}$ composite cathode exhibits a much lower initial discharge capacity of 1.95 mAh (as compared with 32.8 mAh), thereby showing that the in-situ coating process imparts the composite cathode with high electrochemical performance.

Thus, as presented herein, this disclosure relates to solid-state lithium sulfur (Li—S) batteries, and more particularly, to composite sulfur cathodes (and their method of production) based on sulfide solid electrolytes. In other words, a composite sulfur cathode for all-solid-state lithium-sulfur battery comprises a conductive carbon component (e.g., carbon fiber) as an electron conductive skeleton, a sulfide electrolyte component coated on the conductive carbon component via a liquid-phase process as a Li-ion conductor, and an elemental sulfur as an active material is disclosed such that the composite cathode has a close inner contact without requiring a high pressure system.

Preparation of the composite cathode includes three steps. In a first step, dispersed carbon fiber (i.e., conductive carbon component) is synthesized from cotton to form carbonized dispersed cotton fiber (CDCF). In a second step, in-situ coating of the CDCF with $Li_7P_3S_{11}$ (i.e., electrolyte component) forms CDCF@$Li_7P_3S_{11}$ composite powder. Finally, in a third step, active elemental sulfur powder is mixed with CDCF@$Li_7P_3S_{11}$ composite powder to form a composite sulfur cathode (CDCF@S@$Li_7P_3S_{11}$). Thus, as formed herein, this in-situ coating process is a liquid-phase process which results in a close contact between the conductive carbon component and the electrolyte component. Subsequent mixing and heating with elemental sulfur forms a composite cathode having excellent electrochemical performance (e.g., extremely high capacity—e.g., 22 mAh/cm$^2$— at 60° C.).

Advantages include (1) extremely high sulfur loading may be achieved in the composite cathode with superior ion and electron conductivity; (2) low-cost starting material cotton is used as the carbon fiber source; (3) carbon fiber with high dispersibility is obtained by hydrolysis using concentrated sulfuric acid; (4) sulfide electrolyte is coated on the surface of the conductive carbon component via liquid-phase method, ensuring intimate contact between the carbon fiber and the sulfide Li-ion conductor; (5) intimate contact between the conductive carbon component and the electrolyte component; (6) a battery assembly capable of working without external pressure; and (7) no usage of liquid electrolyte, which avoids dissolution of polysulfides and mitigates polysulfide shuttling.

Therefore, the Li—S battery made from the cathode formed from the methods presented herein has an extremely high initial discharge capacity (e.g., greater that 22 mAh/cm$^2$), as compared with conventional Li—S batteries.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. The indefinite article "a" or "an" and its corresponding definite article "the" as used herein means at least one, or one or more, unless specified otherwise.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method of forming a composite cathode for a lithium-sulfur battery, comprising:
   synthesizing dispersed carbon fiber from cotton to form a carbonized dispersed cotton fiber (CDCF) powder, the synthesizing comprises:
      hydrolyzing the cotton in acid to forma dispersed cotton fiber (DCF); and
      heating the DCF at a temperature of at least 1000° C. to form the CDCF powder; and
   in-situ coating of the CDCF with an electrolyte component to form a composite powder; and
   mixing active elemental sulfur powder with the composite powder to form the composite cathode.

2. A method of forming a composite cathode for a lithium-sulfur battery, comprising:
   synthesizing dispersed carbon fiber from cotton to form a carbonized dispersed cotton fiber (CDCF) powder;
   in-situ coating of the CDCF with an electrolyte component to form a composite powder, wherein the in-situ coating comprises:
      forming a precursor powder comprising lithium sulfide ($Li_2S$) and phosphorus pentasulfide ($P_2S_5$);
      depositing the precursor powder on the CDCF; and
      reacting $Li_2S$ with $P_2S_5$ on the CDCF to form the composite powder; and
   mixing active elemental sulfur powder with the composite powder to form the composite cathode.

3. The method of claim 2, wherein the depositing comprises:
   dissolving the precursor powder into an organic solvent containing CDCF powder; and
   evaporating the organic solvent to form a precursor powder-coated CDCF,
   wherein the dissolving and evaporating are conducted at a temperature below 100° C.

4. The method of claim 3, wherein a weight ratio of organic solvent to a combined mass of $Li_2S$ and $P_2S_5$ to a mass of CDCF during the dissolving is in a range of 40:2:1 to 80:2:1, respectively.

5. The method of claim 2, wherein the reacting comprises:
   heating the CDCF to a temperature of at least 225° C.

6. The method of claim 1, wherein the mixing comprises:
   grinding active elemental sulfur powder with the composite powder to form a sieved composite; and
   heating the sieved composite to a temperature of at least 155° C.

7. A composite cathode formed by the method of claim 1.

8. The method of claim 1, wherein the in-situ coating comprises:
   forming a precursor powder comprising lithium sulfide ($Li_2S$) and phosphorus pentasulfide ($P_2S_5$);
   depositing the precursor powder on the CDCF; and
   reacting $Li_2S$ with $P_2S_5$ on the CDCF to form the composite powder.

9. The method of claim 8, wherein the depositing comprises:
   dissolving the precursor powder into an organic solvent containing CDCF powder; and
   evaporating the organic solvent to form a precursor powder-coated CDCF,
   wherein the dissolving and evaporating are conducted at a temperature below 100° C.

10. The method of claim 9, wherein a weight ratio of organic solvent to a combined mass of $Li_2S$ and $P_2S_5$ to a mass of CDCF during the dissolving is in a range of 40:2:1 to 80:2:1, respectively.

11. The method of claim 8, wherein the reacting comprises:
   heating the CDCF to a temperature of at least 225° C.

12. The method of claim 1, wherein the electrolyte component comprises at least one of: $Li_{10}GeP_2S_{12}$, $\beta\text{-}Li_3PS_4$, $Li_{9.6}P_3S_{12}$, $Li_3PS_4$, and $Li_7P_3S_{11}$.

13. The method of claim 1, wherein the CDCF comprises an average fiber length from 100 μm to 200 μm.

14. The method of claim 2, wherein the mixing comprises:
   grinding active elemental sulfur powder with the composite powder to form a sieved composite; and
   heating the sieved composite to a temperature of at least 155° C.

15. The method of claim 2, wherein the electrolyte component comprises at least one of: $Li_{10}GeP_2S_{12}$, $\beta\text{-}Li_3PS_4$, $Li_{9.6}P_3S_{12}$, $Li_3PS_4$, and $Li_7P_3S_{11}$.

16. The method of claim 2, wherein the CDCF comprises an average fiber length from 100 μm to 200 μm.

17. A composite cathode formed by the method of claim 2.

* * * * *

UNITED STATES PATENT AND TRADEMARK OFFICE
CERTIFICATE OF CORRECTION

PATENT NO. : 11,682,792 B2
APPLICATION NO. : 17/115235
DATED : June 20, 2023
INVENTOR(S) : Michael Edward Badding et al.

It is certified that error appears in the above-identified patent and that said Letters Patent is hereby corrected as shown below:

On the Title Page

On the page 2, in Column 2, under item (56) "Other Publications", Line 20, delete "CI0.3" and insert -- Cl0.3 --.

In the Claims

In Column 12, Line 22, in Claim 1, delete "forma" and insert -- form a --.

In Column 13, Line 25, in Claim 15, delete "$Li_{10}$ $GeP_2S_{12}$," and insert -- $Li_{10}GeP_2S_{12}$, --.

Signed and Sealed this
Twenty-third Day of April, 2024

Katherine Kelly Vidal
*Director of the United States Patent and Trademark Office*